(12) United States Patent
Adkins et al.

(10) Patent No.: US 9,009,205 B2
(45) Date of Patent: *Apr. 14, 2015

(54) ACTIVITY-BASED BLOCK MANAGEMENT OF A CLUSTERED FILE SYSTEM USING CLIENT-SIDE BLOCK MAPS

(75) Inventors: Janet Adkins, Austin, TX (US); Matthew T. Brandyberry, Austin, TX (US); Ninad Palsule, Beaverton, OR (US)

(73) Assignee: International Business Machines Corporation, Armonk, NY (US)

(*) Notice: Subject to any disclaimer, the term of this patent is extended or adjusted under 35 U.S.C. 154(b) by 861 days.

This patent is subject to a terminal disclaimer.

(21) Appl. No.: 13/210,080

(22) Filed: Aug. 15, 2011

(65) Prior Publication Data

US 2013/0046890 A1 Feb. 21, 2013

(51) Int. Cl.
*G06F 17/30* (2006.01)
*H04L 29/08* (2006.01)
*H04L 12/64* (2006.01)
*H04L 29/06* (2006.01)

(52) U.S. Cl.
CPC ........ *H04L 67/1097* (2013.01); *H04L 12/6418* (2013.01); *G06F 17/30197* (2013.01); *G06F 17/302* (2013.01); *H04L 67/42* (2013.01)

(58) Field of Classification Search
CPC ... G06F 3/0605; G06F 3/0607; G06F 3/0631; G06F 17/30607
USPC .......................... 707/823, 781; 709/220, 223
See application file for complete search history.

(56) References Cited

U.S. PATENT DOCUMENTS

| | | | | |
|---|---|---|---|---|
| 8,086,585 | B1* | 12/2011 | Brashers et al. | 707/705 |
| 2002/0112054 | A1* | 8/2002 | Hatanaka | 709/225 |
| 2004/0143664 | A1 | 7/2004 | Usa et al. | |
| 2006/0010169 | A1* | 1/2006 | Kitamura | 707/200 |
| 2007/0011214 | A1 | 1/2007 | Jujjuri | |
| 2008/0005468 | A1* | 1/2008 | Faibish et al. | 711/114 |
| 2009/0144388 | A1 | 6/2009 | Gross et al. | |
| 2010/0005172 | A1* | 1/2010 | Singer et al. | 709/225 |
| 2011/0078119 | A1* | 3/2011 | Soran et al. | 707/649 |
| 2011/0153420 | A1* | 6/2011 | Harvey | 705/14.52 |
| 2012/0151245 | A1* | 6/2012 | Chang et al. | 714/4.1 |

* cited by examiner

*Primary Examiner* — Alex Gofman
(74) *Attorney, Agent, or Firm* — Yudell Isidore PLLC; Thomas E Tyson

(57) ABSTRACT

A technique for operating a client node in a clustered file system includes allocating a number of blocks during a first time window and tracking the number of blocks allocated during the first time window. The technique further includes transmitting a block allocation request to a server node of the clustered file system for a number of requested blocks in response to a number of free blocks in a client-side block map reaching a first threshold value. In this case, the number of the requested blocks is based on the number of blocks allocated by the client node during the first time window.

13 Claims, 6 Drawing Sheets

ACTIVITY-BASED BLOCK MANAGEMENT OF A CLUSTERED FILE SYSTEM USING CLIENT-SIDE BLOCK MAPS

BACKGROUND

This disclosure relates generally to activity-based block management of a clustered file system and, more specifically, to activity-based block management of a clustered file system using client-side block maps.

A file system facilitates organizing data by providing procedures to store, retrieve and update the data, as well as manage available space on storage devices that store the data. In general, a file system attempts to organize data in an efficient manner, is tuned to specific characteristics of an associated storage device, and is tightly coupled with an operating system (OS). A file system allows programs to access data in the form of files on a storage device by file name, as contrasted with directly accessing data regions or areas on the storage device.

File systems are implemented with various data storage media (e.g., magnetic storage disks, optical disks, magnetic tapes, and solid state disks) to maintain a physical location of files on the storage media. A file system may provide access to data on a file server by acting as a client for a network protocol. Alternatively, a file system may be virtualized and only exist as an access method for virtualized data. In general, file systems allocate space in a granular manner, usually allocating multiple physical units on a storage media for each file. File systems are responsible for organizing files and directories and keeping track of which areas of a storage media belong to which file and which areas of the storage media are not being used.

A clustered file system is a file system that is shared by being simultaneously mounted on multiple servers. A number of different architectural approaches may be employed for shared disk file systems. Some shared disk file systems distribute metadata (file information, such as file location, file size, etc.) across all servers in a cluster, i.e., are fully distributed file systems. Other shared disk file systems utilize a centralized metadata server, i.e., are partially distributed file systems. Whether a shared disk system is fully or partially distributed, all servers of the shared disk file system are configured to access all data on all shared storage devices.

SUMMARY

According to one aspect of the present disclosure, a technique for operating a client node in a clustered file system includes allocating a number of blocks during a first time window and tracking a number of blocks allocated during the first time window. The technique further includes transmitting a block allocation request to a server node of the clustered file system for a number of requested blocks in response to a number of free blocks in a client-side block map reaching a first threshold value. In this case, the number of the requested blocks is based on the number of blocks allocated by the client node during the first time window.

According to another aspect of the present disclosure, a technique for operating a server node in a clustered file system includes tracking a number of free blocks in the clustered file system. The technique further includes transmitting a client-side block map revocation message to one or more client nodes of the clustered file system in response to the number of the free blocks in the clustered file system falling below a first threshold value.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

Figure 1:
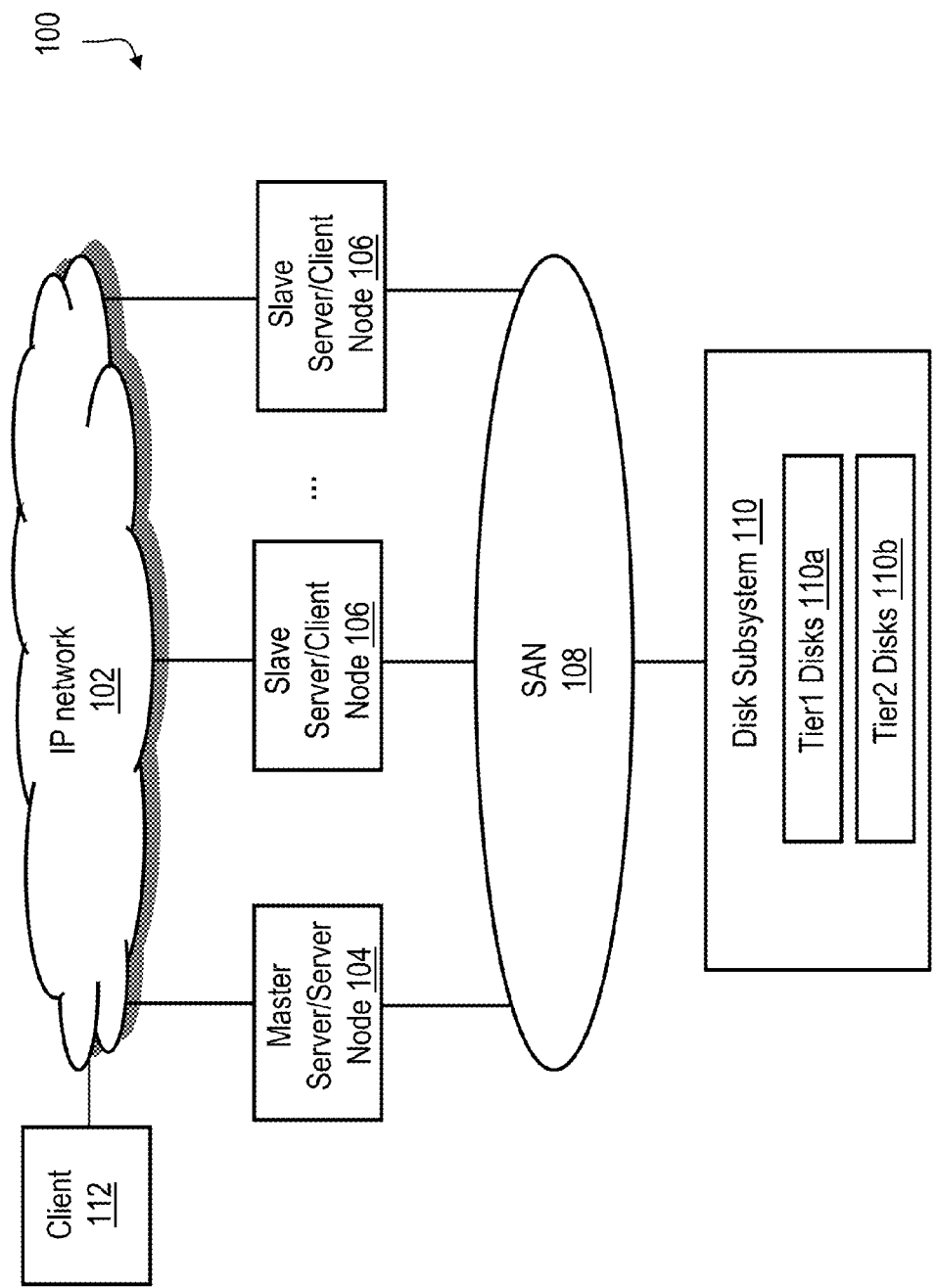
FIG. 1 is a block diagram of a relevant portion of an exemplary clustered file system according to various aspects of the present disclosure.

According to various aspects of the present disclosure, a technique for operating a client node in a clustered file system includes allocating a number of blocks during a first time window and tracking a number of blocks allocated during the first time window. The technique further includes transmitting a block allocation request to a server node of the clustered file system for a number of requested blocks in response to a number of free blocks in a client-side block map reaching a first threshold value. In this case, the number of the requested blocks is based on the number of blocks allocated by the client node during the first time window. According to another aspect of the present disclosure, a technique for operating a server node in a clustered file system includes tracking a number of free blocks in the clustered file system. The technique further includes transmitting a client-side block map revocation message to one or more client nodes of the clustered file system in response to the number of the free blocks in the clustered file system falling below a first threshold value.

As will be appreciated by one skilled in the art, aspects of the present invention may be embodied as a system, method or computer program product. Accordingly, aspects of the present invention may take the form of a hardware embodiment or an embodiment combining software (including firmware, resident software, micro-code, etc.) and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of the computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. As may be used herein, the term "coupled" includes both a direct electrical connection between blocks or components and an indirect electrical connection between blocks or components achieved using one or more intervening blocks or components.

In at least some modern clustered file systems, metadata management is performed by a separate metadata server node (master server) and applications (e.g., virtual input/output (I/O) server applications) execute on client nodes (slave servers) where the file system is mounted. In a typical implementation, client nodes are only responsible for writing user data and are not allowed to read or write metadata areas. In this case, client nodes have had to communicate with a metadata server node to allocate new file backing blocks.

To improve write performance in clustered file systems, client-side block maps may be employed so that block allocation for files can be initiated by a client node without accessing a metadata server node. In this case, the metadata server node tracks blocks assigned to client nodes in a special metadata file, which can be used for recovery in the event of client node or server node failure. According to aspects of the present disclosure, implementation of a client-side block map addresses a number of potential issues. For example, according to the present disclosure a client-side block map is configured to maintain adequate free blocks such that write requests to a virtual I/O server application are not normally delayed. As another example, according to the present disclosure each client node is configured such that a client node does not cache more free blocks than needed and, thus, prevent other client nodes from utilizing free blocks unnecessarily cached by a client node that does not need the free blocks. As yet another example, according to the present disclosure a server node is configured to assert control over client-side block maps in the event that free space in a file system is below a threshold value.

According to various aspects of the present disclosure, activity-based block management is implemented on the client-side and requirement-based block revocation is implemented on the server-side. In various embodiments, each client node may implement a client-side block map (that maintains block allocation activity, e.g., disk blocks assigned to a file), which is used by a client node to request an appropriate number of additional blocks (from a server node) and to return blocks to the server node when there is no (or minimal) activity for some predetermined time period. According to other aspects of the present disclosure, the server node monitors a total free space for the file system and when the total free space falls below a predetermined threshold value the server node broadcasts a message to all (or at least some) of the client nodes to revoke respective client-side block maps.

According to aspects of the present disclosure, each client node is configured to maintain a respective client-side block map (e.g., a map maintained in memory that provides an indication of blocks assigned to files and free blocks), such that client nodes are neither too charitable (i.e., reserving fewer disk blocks than required to satisfy incoming file allocations) nor too greedy (i.e., reserving more disk blocks than required for incoming file allocations at the expense of other client nodes). In order to maintain a client-side block map, a client node may be configured to track block allocation activities. For example, each client node may be configured to track the number of blocks allocated in a specific time window. In various embodiments, the frequency at which samples 'S' are collected is configurable and can be implemented by a client-side thread that wakes during each specific time window. Given an ideal frequency 'Z' at which to request additional blocks from the server node, the client node calculates the number of requested blocks 'R' (based on recent allocation activity) such that the requested blocks 'R' should be sufficient to satisfy the set of allocations requested on the client node in the next period defined by the ideal frequency 'Z'.

According to one or more embodiments, the block allocation calculation is performed and the number of requested blocks 'R' is updated following each sample period 'S'. The client node then sends a block allocation request to the server node when the number of free blocks 'F' in the client-side block map reaches a threshold value defined by a percentage 'P' of the requested blocks 'R'. For example, assuming a constant level of allocation activity, a client node may ask for a same number 'N' of requested blocks 'R' from the server node at the ideal frequency 'Z'. In this case, free blocks 'F' in the client-side block map may fluctuate between P*R on the low-end and (100%+P)*R on the high-end.

Under variable levels of allocation activity, the requested blocks 'R' are calculated such that each increase of allocation activity results in a gradual increase in the value of the requested blocks 'R' and each decrease in allocation activity results in a gradual decrease in the value of the requested blocks 'R'. This ensures that, over time, the requested blocks 'R' converge on the ideal value, but are not over-influenced by allocation activity anomalies. In one or more embodiments, the rate at which the value of the requested blocks 'R' converge on the ideal value after a change in allocation activity may be controlled by an acceleration 'A' factor and a deceleration 'D' factor. It should be appreciated that since the ideal frequency 'Z' is used in the calculation of the requested blocks 'R' (i.e., requests are sent to the server node when the free blocks 'F' in the client-side block map drop below the threshold value and are not restricted by the ideal frequency 'Z'), the disclosed approach has the ability to effectively manage gradual changes in the requested blocks 'R' by requesting blocks more frequently (during increased activity) or less frequently (during decreased activity).

In general, the client-side block replenish approach described above is sufficient for a client node to maintain its client-side block map when allocation activity is present. During periods of no (or minimal) activity, a client node may take the additional step of initiating a block return to the server node. For example, when the requested blocks 'R' converge to zero and the free blocks 'F' in the client-side block map are greater than some minimum value 'M', a client node may take the additional step of initiating a block return to the server node. For example, in this case, the client-side thread that executes at the sample frequency may send the number of blocks defined by the difference between the free blocks 'F' in the client-side block map and the minimum value 'M' back to the server node.

In one or more embodiments, the server node is also configured to track the number of free blocks in the complete file system. For example, the server node may support a configurable threshold value for file system space. According to one or more aspects of the present disclosure, when free blocks fall below a threshold value (e.g., ten percent of a total number of blocks implemented in the complete file system), the server node may broadcast a message to all client nodes to revoke all blocks (or some portion of the blocks) in their client-side block maps. Alternatively, the message can be transmitted to selected client nodes that are currently caching client-side block maps. In general, the revocation message provides an indication to client nodes to discontinue client-side (local) block map management, until client-side block map management is again allowed by the server node.

In various embodiments, after receiving a revoke client-side block map message (from the server node) a client node transmits one or more messages to the server node with extents (i.e., a contiguous set of blocks specified by a start block and a length) the client node is returning and, on returning all extents, the client node transmits a revoke client-side block map response message. It should be appreciated that after returning all extents, a client node is required to generate block allocation requests to the server node, as the client node is no longer currently maintaining a client-side block map. For example, a client node may send a block allocate (BlkAllocate) message to the server node when the client node requires allocation of a new file backing disk block. In response to the block allocate message, the server node allocates (when available) disk blocks from a main persistent disk block map and returns information on the allocated blocks to a requesting client node. The server node may also inform the requesting client node whether the client node is allowed to cache a client-side block map. For example, whether the client node is allowed to cache a client-side block map may depend on whether free space is greater than a threshold value (e.g., twenty percent of a total number of blocks implemented in the complete file system).

As server-side block map free space grows above a threshold value (e.g., due to a disk add operation by an administrator), a response to a block allocate message from a client node may return a TRUE value to the client node for a can cache block map (CanCacheBlockMap) request to indicate that the client node is allowed to cache a client-side block map. Upon receiving the TRUE value, the client node can resume caching a client-side block map and resume sending replenish block messages to the server node. It should be appreciated that the server node can employ the client-side block map revocation mechanism for various purposes, e.g., maintaining ownership of block allocation. According to another aspect of the present disclosure, a client node may be configured to cache respective client-side block maps on a per storage tier basis. In this case, a server node may only revoke a client-side block map for a specific storage tier. For example, a client node may revoke a client-side block map for a first disk storage tier and not revoke a client-side block map for a second disk storage tier.

With reference to FIG. 1, a relevant portion of an exemplary clustered file system 100, configured according to an embodiment of the present disclosure, is illustrated. File system 100 includes a master server (server node) 104 and multiple slave servers (client nodes) 106, that are coupled between a storage area network (SAN) 108 and an Internet protocol (IP) network 102. Throughout the disclosure the term 'master server' is used interchangeably with the term 'server node' and the term 'slave server' is used interchangeably with the term 'client node'. In this embodiment, server node 104 has a server-client relationship with client nodes 106, as server node 104 maintains file metadata that describes locations and sizes of files stored on disk subsystem 110 and is used by client nodes 106 to access the files stored on disk subsystem 110.

In one or more embodiments, disk subsystem 110 includes disks that are maintained in multiple tiers, i.e., tier1 disks 110a and tier2 disks 110b. While disk subsystem 110 is depicted with two disk tiers, it should be appreciated that a disk subsystem configured according to the present disclosure may include more or less than two disk tiers. As is described in further detail below, server node 104 and client nodes 106 execute virtual input/output server (VIOS) applications to facilitate reading files from and writing files to disk subsystem 110. For example, any of server node 104 and client nodes 106 may function as file servers for client (computer system) 112 coupled to IP network 102. Server node 104 and client nodes 106 may communicate with each other via IP network (e.g., the Internet) 102 or may communicate with each other over a dedicated network (not shown).

Figure 2:
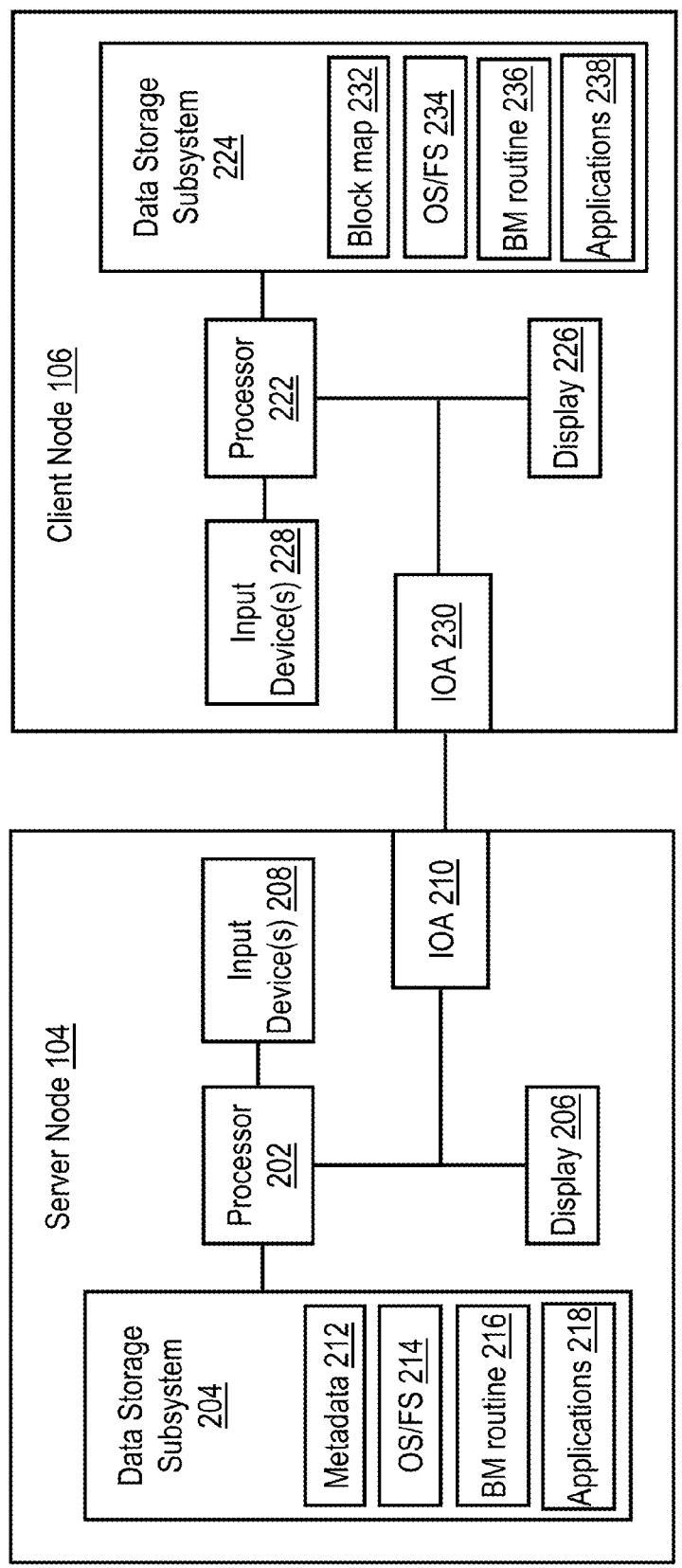
FIG. 2 is a block diagram of relevant portions of an exemplary master server (server node) and an exemplary slave server (client node) employed in the clustered file system of FIG. 1 according to various aspects of the present disclosure.

With reference to FIG. 2, an exemplary server node 104 is illustrated coupled to an exemplary client node 106. Server node 104 includes a processor 202 (which may include one or more processor cores for executing program code) coupled to a data storage subsystem 204, a display 206, one or more input devices 208, and an input/output adapter (IOA) 210. Data storage subsystem 204 may include, for example, an application appropriate amount of volatile memory (e.g., dynamic random access memory (DRAM)), non-volatile memory (e.g., read-only memory (ROM) or static RAM), and/or a non-volatile mass storage device, such as a magnetic or optical disk drive. Data storage subsystem 204 includes a metadata file 212 for clustered file system 100, an operating system (OS)/file system (FS) 214 for server node 104, a block map (BM) routine 216 for managing server-side block allocation of disk subsystem 110, as well as applications 218, which may include a browser (which may optionally include customized plug-ins to support various client applications), an email program, and a VIOS application, among other applications.

Client node 106 includes a processor 222 (which may include one or more processor cores for executing program code) coupled to a data storage subsystem 224, a display 226, one or more input devices 228, and an input/output adapter (IOA) 230. Data storage subsystem 224 may include, for example, an application appropriate amount of volatile memory (e.g., DRAM), non-volatile memory (e.g., ROM or static RAM), and/or a non-volatile mass storage device, such as a magnetic or optical disk drive. Data storage subsystem 224 maintains a client-side block map 232, an OS/FS 234 for client node 106, a block map (BM) routine 236 for managing client-side block allocation, as well as applications 238, which may include a browser (which may optionally include customized plug-ins to support various client applications), an email program, and a VIOS application, among other applications.

Displays 206, 226 may be, for example, cathode ray tubes (CRTs) or a liquid crystal displays (LCDs). Input device(s) 208, 228 may include, for example, a mouse, a keyboard, haptic devices, and/or a touch screen. Server node 104 and client node 106 communicate via IOAs 210, 230 over a network or a direct connection.

Figure 3:
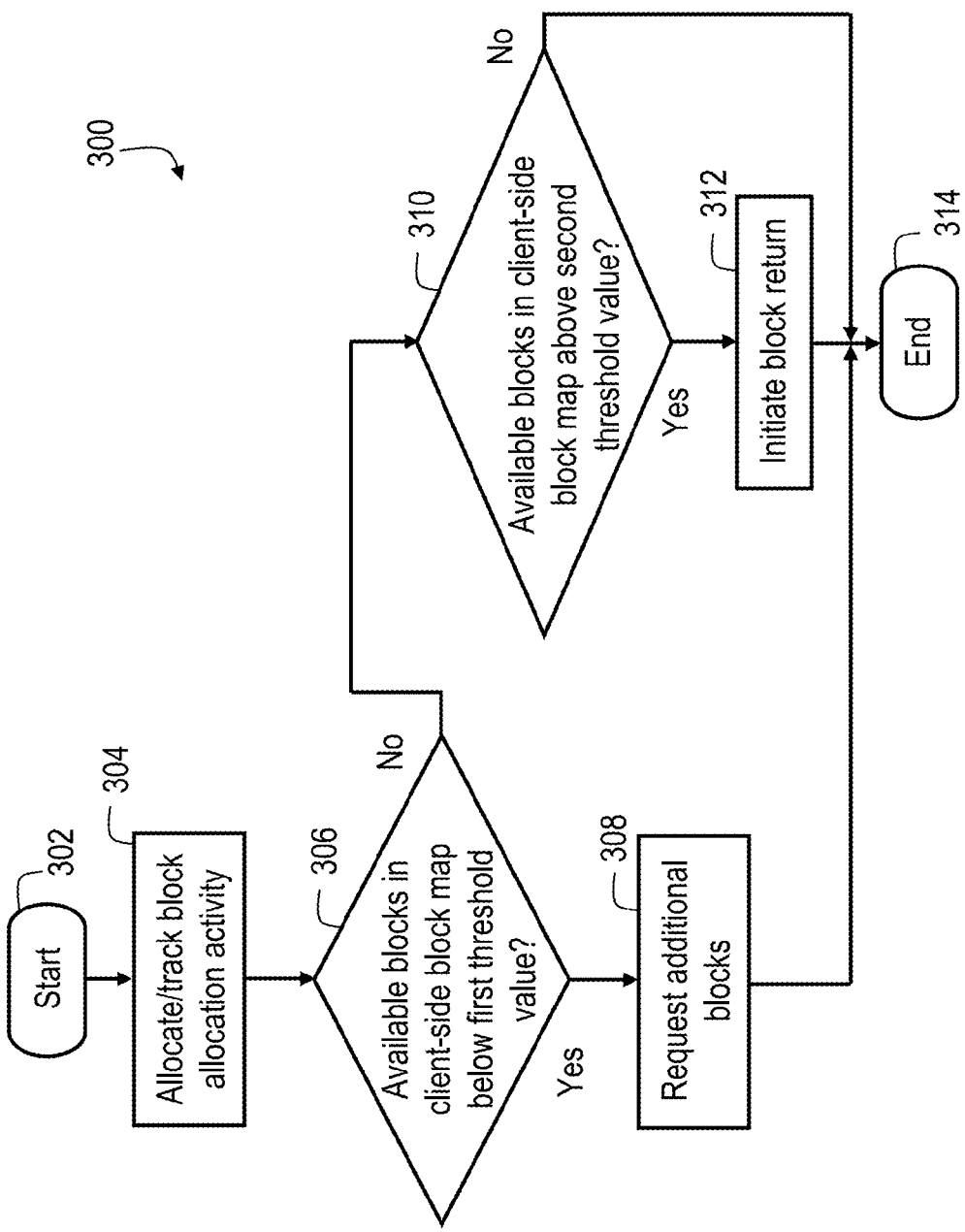
FIG. 3 is a flowchart of an exemplary process (implemented by a client node) for managing blocks of a client-side block map according to the present disclosure.

With reference to FIG. 3, an example process 300 (e.g., implemented within BM routine 236) is illustrated for managing blocks of client-side block map 232 by client node 106. Process 300 is initiated at block 302 by client node 106 in response to, for example, a message from server node 104 allowing client node 106 to manage disk block allocation using client-side block map 232. Process 300 then proceeds to block 304 where client node 106 allocates blocks to files and tracks block allocation activity during a time window. Next, in decision block 306, client node 106 determines whether available blocks in a client-side block map 232 are below a first threshold value (e.g., twenty blocks). In response to the available blocks in client-side block map 232 being below the first threshold value in block 306, control transfers to block 308. In block 308 client node 106 requests one or more additional blocks from server node 104. For example, a number of the requested additional blocks may be based on the number of blocks allocated by client node 106 during the time window. The first threshold value may, for example, be based on the number of requested blocks. Following block 308, control transfers to block 314 where process 300 terminates until, for example, a next sampling period.

In response to the available blocks in client-side block map 232 being above the first threshold value in block 306, control transfers from block 306 to decision block 310. In block 310 client node 106 determines whether the number of available blocks in a client-side block map 232 are above a second threshold value (e.g., sixty blocks). In response to the available blocks in client-side block map 232 being above the second threshold value in block 310, control transfers to block 312. In block 312, client node 106 initiates return of blocks that are not currently needed due to relatively low (or zero) block allocation activity. That is, client node 106 initiates a block return from client-side block map 232 to server node 104 in response to the number of requested blocks converging to zero and the free blocks in client-side block map 232 being greater than a minimum value. Following block 312 control transfers to block 314. In response to the available blocks in client-side block map 232 not being above the second threshold value in block 310, control transfers from block 310 to block 314.

Figure 4:
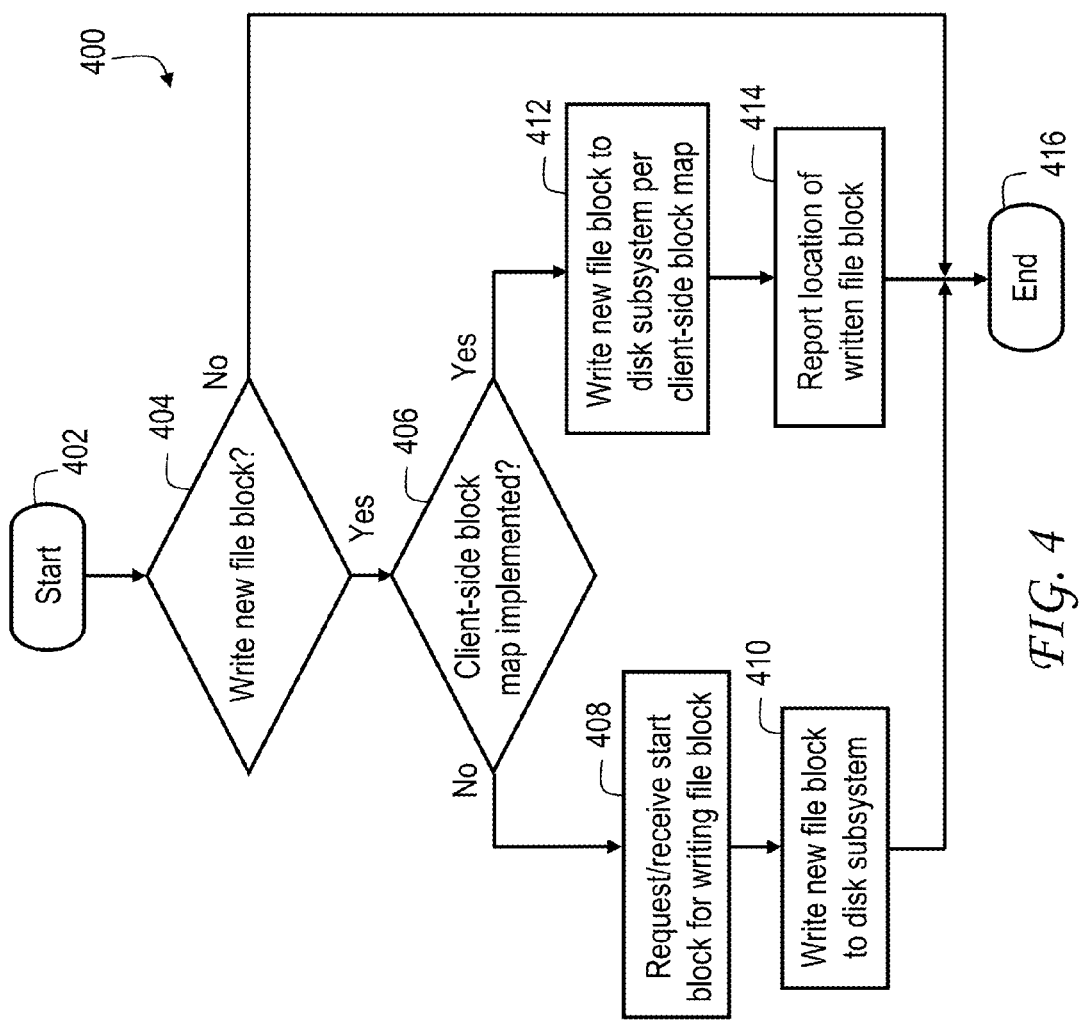
FIG. 4 is a flowchart of an exemplary process (implemented by a client node) for writing file blocks according to the present disclosure.

With reference to FIG. 4, an example process 400 (e.g., implemented within BM routine 236) is illustrated for writing a new file block (e.g., a block for a new file or a new block for an existing file) by a client node 106 to disk subsystem 110. Process 400 is initiated at block 402 by client node 106 in response to, for example, VIOS application 238 of client node 106 receiving a file read/write request from, for example, client 112. Process 400 then proceeds to decision block 404 where client node 106 determines whether the request corresponds to a request to write a new file block to disk subsystem 110. In block 404, when the request does not correspond to a request to write a new file block (e.g., the request is a request to read an existing file from disk subsystem 110), control transfers to block 416, where process 400 terminates until a next file read/write request is received. In block 404, when the request corresponds to a request to write a new file block, control transfers to decision block 406.

In block 406 client node 106 determines whether client-side block map 232 is currently implemented (active). In response to client-side block map 232 not being currently active in block 406, control transfers to block 408. In block 408, client node 106 requests a start block for writing a file block and waits to receive the start block for the file from server node 104 before proceeding to block 410. In block 410, client node 106 initiates writing the new file block to disk subsystem 110 at the start block provided by server node 104. Following block 410, control transfers to block 416. In response to client-side block map 232 being currently active in block 406, control transfers to block 412. In block 412, client node 106 initiates writing a new file block to disk subsystem 110 per client-side block map 232.

Next, in block 414, client node 106 reports the location of the new file block to server node 104, which maintains the location (among other items) of files in metadata 212. It should be appreciated that while a write request causes a block to be allocated from client-side block map 232 and associated with the write request, the block may not be written to disk subsystem 110 immediately. For example, the actual block write to disk subsystem 110 (by client node 106) may wait for a commit/synchronization interval. In this case, following the actual block write, client node 106 then notifies server node 104 of the location of the written block. Following block 414, control transfers to block 416.

Figure 5:
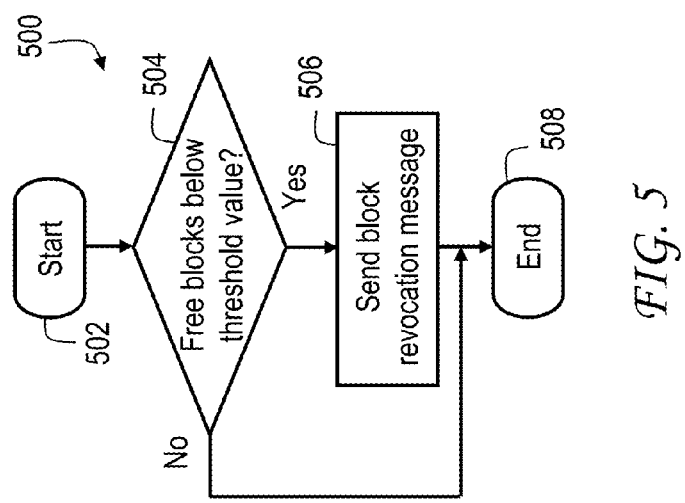
FIG. 5 is a flowchart of an exemplary process (implemented by a server node) for revoking blocks of a client-side block map according to the present disclosure.

With reference to FIG. 5, an example process 500 (e.g., implemented within BM routine 216) is illustrated that is executed by server node 104 to determine whether client-side block map 232 (of client node 106) should be revoked. Process 500 is periodically initiated at block 502 by server node 104 in response to, for example, expiration of a timer that indicates server node 104 should check the number of free blocks available in disk subsystem 110 for clustered file system 100. Process 500 then proceeds to decision block 504 where server node 104 determines whether the free blocks of file system 100 are below a threshold value (e.g., five percent of a total number of blocks implemented).

In response to the free blocks not being below the threshold value in block 504, control transfers to block 508 where process 500 terminates until a next timer expiration. In response to the free blocks being below the threshold value in block 504, control transfers to block 506. In block 506, server node 104 sends a client-side block map revocation message to client node 106. For example, server node 104 may transmit a client-side block map revocation message to all client nodes 106 or only those client nodes 106 that are currently maintaining a client-side block map 232. In one or more embodiments, the client-side block map revocation message may only be applicable to a client-side block map 232 for a specific storage tier (e.g., tier1 disks 110a or tier2 disks 110b). Following block 506 control transfers to block 508.

Figure 6:
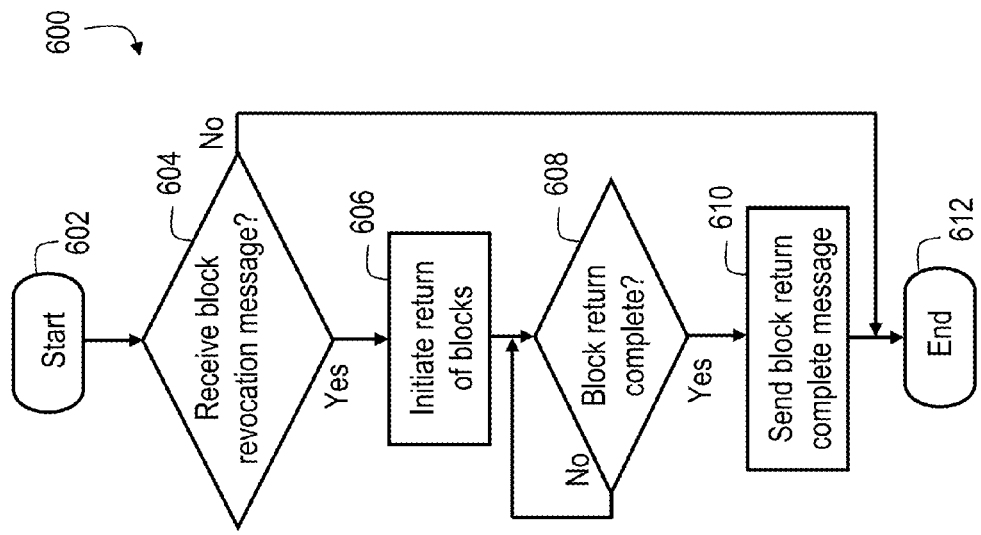
FIG. 6 is a flowchart of an exemplary process (implemented by a client node) for returning blocks of a client-side block map according to the present disclosure.

With reference to FIG. 6, an example process 600 (e.g., implemented within BM routine 236) is illustrated that is invoked by client node 106 in response to receiving a client-side block map revocation message from server node 104. Process 600 is initiated at block 602 (by client node 106) in response to, for example, receipt of a message from server node 104. In response to the received message (from server node 104) not corresponding to a client-side block map revocation message in block 604, control transfers from block 604 to block 612. In block 612, process 600 terminates until a next message is received from server node 104. In response to the received message (from server node 104) corresponding to a client-side block map revocation message in block 604, control transfers from block 604 to block 606. In block 606, client node 106 initiates return of blocks (maintained in client-side block map 232) to server node 104. For example, client node 106 may transmit one or more extent messages (to server node 104) to return blocks from client-side block map 232 to server node 104. In this case, each of the one or more extent messages provide a contiguous set of blocks (specified by a start block and a length) that client node 106 is returning to server node 104.

Next, in decision block 608, client node 106 determines whether the return of blocks (maintained in client-side block map 232) is complete. For example, client node 106 may return all blocks maintained in client-side block map 232 or only a portion of the blocks maintain in client-side block map 232. In response to the return of blocks (maintained in client-side block map 232) not being complete in block 608, control loops on block 608. In response to the return of blocks (maintained in client-side block map 232) being complete in block 608, control transfers to block 610. In block 610, client node 106 sends a block return complete message to server node 104. Following block 610, control transfers to block 612.

Figure 7:
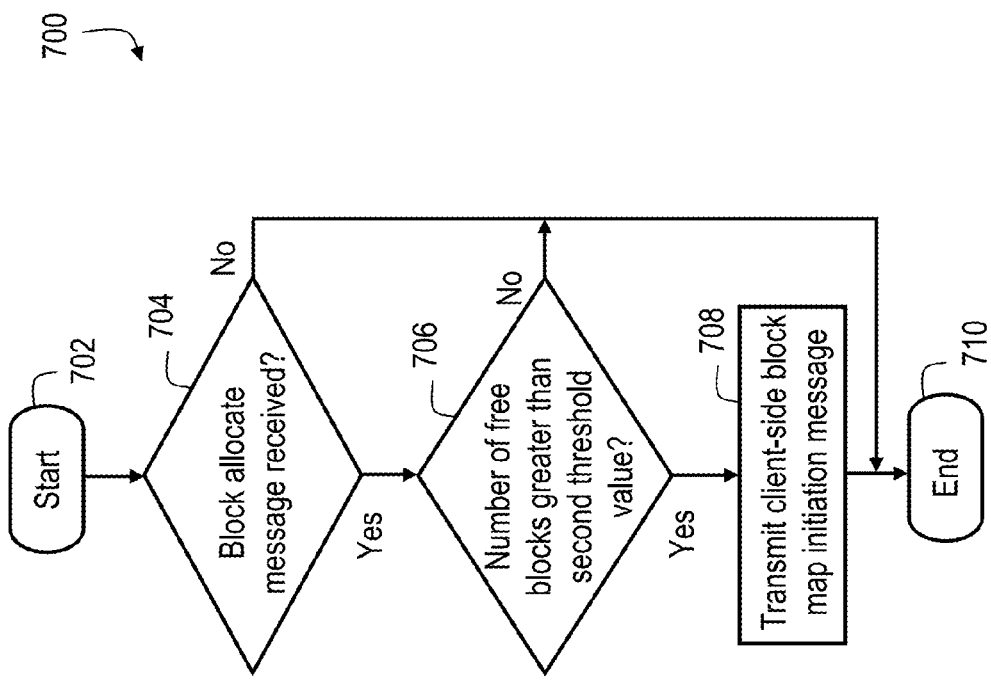
FIG. 7 is a flowchart of an exemplary process (implemented by a server node) for initiating management of a client-side block map by a client node according to the present disclosure.

With reference to FIG. 7, an example process 700 (e.g., implemented within BM routine 216) is illustrated that is executed by server node 104 to determine what action to take when a message is received from client node 106. Process 700 is initiated at block 702 by server node 104 in response to, for example, receipt of a message from client node 106. Process 700 then proceeds to decision block 704, where server node 104 determines whether the received message is a block allocate message from client node 106. In response to the received message not being a block allocate message from client node 106, control transfers to block 710 where process 700 terminates until a next message is received from client node 106. In response to the received message being a block allocate message from client node 106, control transfers to decision block 706.

In block 706, server node 104 determines whether the number of free blocks in disk subsystem 110 of file system 100 is greater than a second threshold value (e.g., twenty percent of a total number of blocks implemented). In response to the number of free blocks in disk subsystem 110 of file system 100 not being greater than the second threshold value in block 706, control transfers to block 710. In response to the number of free blocks in disk subsystem 110 of file system 100 being greater than the second threshold value in block 706, control transfers to block 708. In block 708, server node 104 transmits a client-side block map initiation message to client node 106. Upon receipt of the client-side block map initiation message, client node 106 may resume (or initiate) maintenance of client-side block map 232. Following block 708 control transfers to block 710.

Accordingly, a number of techniques have been disclosed herein that advantageously employ client-side block maps to perform activity-based block management of a clustered file system.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A client node of a clustered file system, the client node comprising:
   a data storage subsystem; and
   a processor coupled to the data storage subsystem, wherein the processor is configured to:
      allocate a number of blocks during a first time window;
      track the number of blocks allocated during the first time window;
      transmit a block allocation request to a server node of the clustered file system for a number of requested blocks in response to a number of free blocks in a client-side block map of one or more client-side block maps falling below a first threshold value, wherein the number of the requested blocks is based on the number of blocks allocated by the client node during the first time window;
      receive, from the server node, a client-side block map revocation message associated with the client-side block map; and
      in response to receiving the client-side block map revocation message, transmit one or more extent messages to the server node, wherein the one or more extent messages each provide a contiguous set of blocks specified by a start block and a length that the client node is returning to the server node; and
   transmit a client-side block map response message to the server node of the clustered file system following transmission of a last one of the one or more extent messages, wherein the client-side block map response message indicates all blocks maintained by the client-side block map have been returned to the server node.

2. The client node of claim 1, wherein the first threshold value is based on the number of the requested blocks.

3. The client node of claim 1, wherein the processor is further configured to:
   initiate a block return from the client-side block map to the server node in response to the number of the requested blocks converging to zero and the free blocks in the client-side block map being greater than a minimum value.

4. The client node of claim 1, wherein the processor is further configured to:
   determine whether the number of free blocks in the client-side block map is above the first threshold value;
   in response to determining the number of free blocks in the client-side block map is above the first threshold value, determine whether the number of free blocks in the client-side block map is above a second threshold value, wherein the second threshold value is greater than the first threshold value; and
   in response to determining whether the number of free blocks in the client-side block map is above the second threshold value, initiate the block return, wherein the block return returns one or more blocks that are not needed due to low block allocation activity of the one or more blocks.

5. The client node of claim 1, wherein:
   in response to a number of free blocks in the clustered file system increasing above a second threshold value, receiving, from the server node, a client-side block map initiation message, wherein the client-side block map initiation message indicates to the client node that the client node can resume caching the client-side block map.

6. A server node of a clustered file system, the server node comprising:
   a data storage subsystem; and
   a processor coupled to the data storage subsystem, wherein the processor is configured to:
      track a number of free blocks in the clustered file system;
      in response the number of the free blocks in the clustered file system falling below a first threshold value, transmit a client-side block map revocation message to one or more client nodes of the clustered file system, wherein the client-side block map revocation message provides an indication to one or more client nodes to discontinue local block map management until local block map management is again allowed by the server node;
      determine whether the number of free blocks in the client-side block map is greater than the first threshold value; and
      in response to determining the number of free blocks in the client-side block map is greater than the first threshold value, determining whether the number of free blocks in the client-side block map is greater than a second threshold value, wherein the second threshold value is greater than the first threshold value; and
   in response to determining that the number of the free blocks in the clustered file system is greater than a second threshold value and receipt of a block allocate message from the first one of the client nodes, transmit a client-side block map initiation message to a first one of the client nodes of the clustered file system, wherein in response to the first one of the client nodes receiving the client-side block map initiation, the first one of the client nodes initiates maintenance of the client-side block map.

7. The server node of claim 6, wherein the client-side block map revocation message is broadcast to all of the client nodes in the clustered file system.

8. The server node of claim 6, wherein the client-side block map revocation message is only transmitted to the client nodes in the clustered file system that are currently maintaining a client-side block map.

9. The server node of claim 6, wherein the client-side block map revocation message only applies to a client-side block map for a specific storage tier of a plurality of storage tiers.

10. The server node of claim 9, wherein:
    the data storage subsystem comprises a plurality of storage tiers including the specific storage tier;
    the client-side block map is one of a plurality of client-side block maps;

each client-side block map of the one or more client-side block maps is associated with only one specific storage tier of the plurality of storage tiers; and the client-side block map revocation message only revokes blocks in the specific storage tier.

11. The client node of claim 1, wherein the client-side block map revocation message provides an indication to the client node to discontinue local block map management of a plurality of blocks in the client-side block map until local block map management is again allowed by the server node.

12. The client node of claim 11, wherein:

the data storage subsystem comprises a plurality of storage tiers;

the one or more client-side block maps comprise one client-side block map for each storage tier of the plurality of storage tiers;

each client-side block map of the one or more client-side block maps is associated with only one specific storage tier of the plurality of storage tiers; and the client-side block map revocation message only revokes blocks in a first storage tier of the plurality of storage tiers.

13. The server node of claim 6, wherein the client-side block map initiation message indicates to the client node that the client node can resume caching the client-side block map.

* * * * *